United States Patent
Chen et al.

(10) Patent No.: US 10,685,642 B2
(45) Date of Patent: Jun. 16, 2020

(54) INFORMATION PROCESSING METHOD

(71) Applicant: Lenovo (Beijing) Co., Ltd., Beijing (CN)

(72) Inventors: Chen Chen, Beijing (CN); Xiaoping Zhang, Beijing (CN)

(73) Assignee: LENOVO (BEIJING) CO., LTD., Beijing (CN)

( * ) Notice: Subject to any disclaimer, the term of this patent is extended or adjusted under 35 U.S.C. 154(b) by 120 days.

(21) Appl. No.: 15/941,822

(22) Filed: Mar. 30, 2018

(65) Prior Publication Data

US 2018/0286381 A1 Oct. 4, 2018

(30) Foreign Application Priority Data

Mar. 31, 2017 (CN) .......................... 2017 1 0209531

(51) Int. Cl.
| | | |
|---|---|---|
| *G10L 15/00* | (2013.01) | |
| *G10L 13/00* | (2006.01) | |
| *G06F 3/14* | (2006.01) | |

(52) U.S. Cl.
CPC .............. *G10L 13/00* (2013.01); *G06F 3/14* (2013.01); *G09G 2340/145* (2013.01)

(58) Field of Classification Search
CPC .. G06F 16/338; G06F 16/438; G06F 16/4393; G10L 15/26
See application file for complete search history.

(56) References Cited

U.S. PATENT DOCUMENTS

| | | | | |
|---|---|---|---|---|
| 7,376,434 B2* | 5/2008 | Thomas | ................ | H04M 3/436 455/414.4 |
| 7,444,003 B2* | 10/2008 | Laumeyer | .......... | G06K 9/00818 348/169 |
| 2006/0276210 A1* | 12/2006 | Thomas | ................ | H04M 3/436 455/466 |
| 2007/0081744 A1* | 4/2007 | Gokturk | ............. | G06K 9/00375 382/305 |

FOREIGN PATENT DOCUMENTS

| | | |
|---|---|---|
| CN | 103220435 A | 7/2013 |
| CN | 103268316 A | 8/2013 |
| CN | 105334955 A | 2/2016 |
| CN | 105872751 A | 8/2016 |
| CN | 106170102 A | 11/2016 |
| CN | 106197462 A | 12/2016 |
| CN | 106331331 A | 1/2017 |
| WO | 2004077829 A1 | 9/2004 |

\* cited by examiner

*Primary Examiner* — Daniel Abebe
(74) *Attorney, Agent, or Firm* — Anova Law Group, PLLC

(57) ABSTRACT

An information processing method includes determining information received by an electronic device is information of a first type, converting the first type information to information of a second type, and, in response to receiving a presentation instruction for the second type information, presenting the second type information on the electronic device using a presentation mode corresponding to the second type information.

12 Claims, 6 Drawing Sheets

INFORMATION PROCESSING METHOD

CROSS-REFERENCE TO RELATED APPLICATION

This application claims priority to Chinese Application No. 201710209531.5, filed on Mar. 31, 2017, the entire contents of which are incorporated herein by reference.

FIELD OF THE DISCLOSURE

The present disclosure generally relates to the field of information processing technology for smart device and, more particularly, to an information processing method and an electronic device.

BACKGROUND

Currently, smart devices are becoming more and more diverse. For example, in addition to smartphones, tablet PCs (personal computers), or the like that have been increasingly popular and widely used in people's everyday lives, smart glasses, smart watches, smart headphones, smart stereos, and other small-screen or screenless smart devices have also been rapidly developed.

The above-mentioned small-screen or screenless smart devices are not convenient for users to browse pictures, videos, or other visual information. For example, for the small-screen devices, such as smart watches, or the like, the small screen leads to a poor display of images or videos. The screenless devices, such as smart headphones, or the like, do not have the image or video display function. Therefore, for instantly visualized information, such as images, videos, or the like, the small-screen or screenless smart devices cannot provide a convenient information processing mode that can provide better user experience for users to obtain information.

SUMMARY

In accordance with the disclosure, there is provided an information processing method includes determining information received by an electronic device is information of a first type, converting the first type information to information of a second type, and, in response to receiving a presentation instruction for the second type information, presenting the second type information on the electronic device using a presentation mode corresponding to the second type information.

Also in accordance with the disclosure, there is provided an electronic device including a processor and an output device coupled to the processor. The processor is configured to determine information received by the electronic device is information of a first type, convert the first type information to information of a second type, and, in response to receiving a presentation instruction for the second type information, control the output device to present the second type information using a presentation mode corresponding to the second type information.

BRIEF DESCRIPTION OF THE DRAWINGS

In order to provide a clearer illustration of embodiments of the present disclosure, brief descriptions of the drawings of the present disclosure are provided. It is apparent that the following drawings are merely embodiments of the present disclosure. Other drawings will be apparent to those skilled in the art from consideration of the drawing of the embodiments disclosed herein.

FIG. 4($b$) is a schematic diagram of displaying image or video information of a smart watch in the form of text and/or voice according to an embodiment of the present disclosure;

DETAILED DESCRIPTION

In order to provide a clear illustration of the present disclosure, embodiments of the present disclosure are described in detail with reference to the drawings. It is apparent that the disclosed embodiments are merely some but not all of embodiments of the present disclosure. Other embodiments of the disclosure may be obtained based on the embodiments disclosed herein by those skilled in the art, which are intended to be within the scope of the disclosure.

Figure 1:
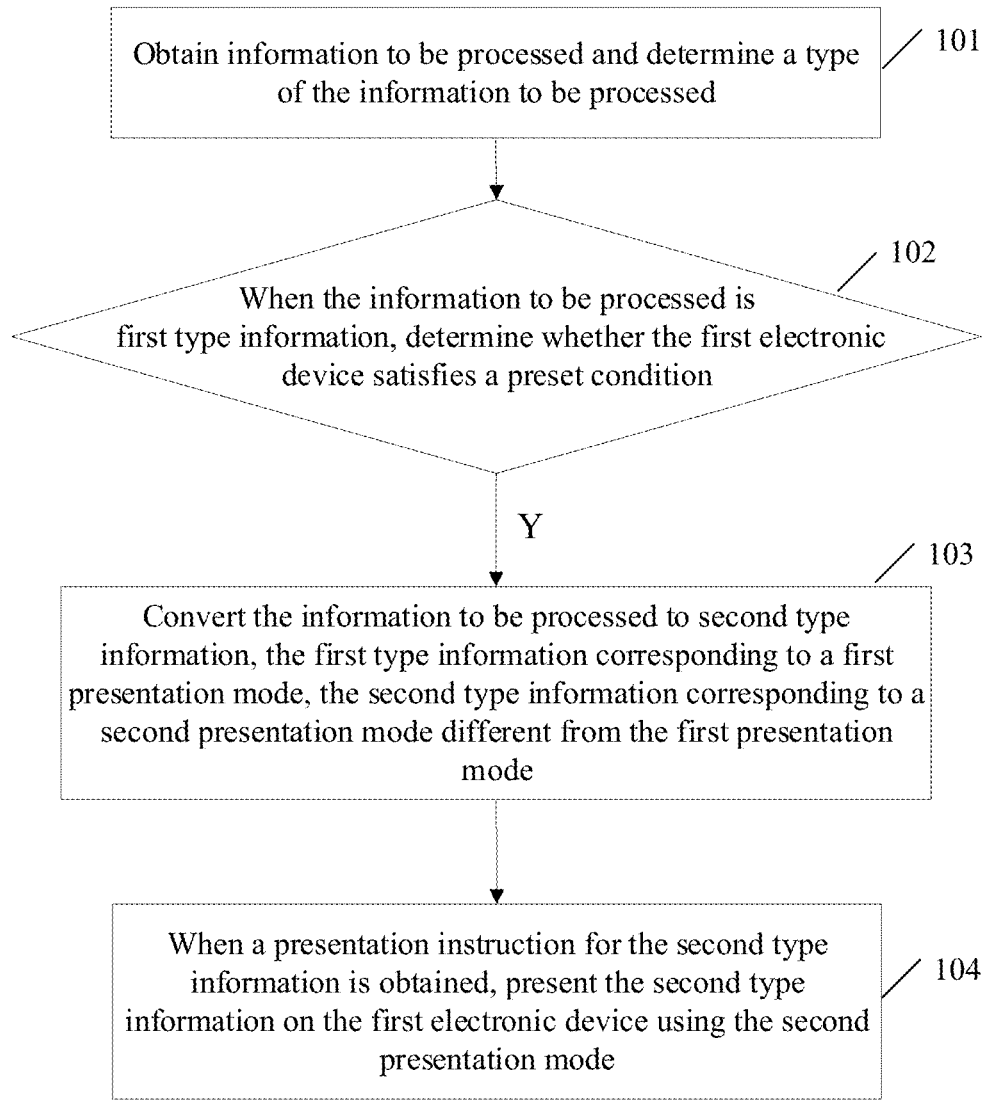
FIG. 1 is a flow chart of an information processing method according to an embodiment of the present disclosure.

The present disclosure provides an information processing method. The information processing method can be implemented in a first electronic device. For example, the first electronic device may be, for example, a small-screen or screenless smart device, such as smart glasses, a smart watch, a smart headphone, or a smart stereo, or a smart device with a normal display area, such as a smartphone or a tablet PC. FIG. 1 shows a flow chart of an example of the information processing method according to the disclosure. As shown in FIG. 1, at 101, information to be processed is obtained and a type of the information to be processed is determined.

In some embodiments, the information to be processed may include an instant message obtained by the first electronic device, for example, a text message, a voice message, an image message, a flash video message, or any other form of information obtained based on instant messaging (IM); corresponding resource information downloaded from the Internet by the first electronic device; or various resource information stored in the first electronic device in advance, but is not limited thereto.

The information to be processed may be one of different types according to the presentation mode corresponding to the information to be processed. In some embodiments, based on the mode for presenting the information to be processed, the type of the information can be, for example, a text type corresponding to a text presentation mode, a voice type corresponding to a voice presentation mode, an image/video type corresponding to an image/video presentation mode, or the like.

At 102, when the information to be processed is first type information, i.e., information of a first type, a first determination result is obtained by determining whether the first electronic device satisfies a preset condition.

The preset condition may be a condition indicating the structure of the first electronic device, for example, a condition indicating whether the first electronic device has a display screen, a condition indicating the characteristic of the display screen, or a condition indicating a status of a user of the first electronic device.

The first type information may be information that cannot be presented or well presented for the user, when the first electronic device satisfies the preset condition.

For example, assume the preset condition is that the electronic device does not have a display screen, thus, the first type information may be information, such as images, videos, or the like, that cannot be presented under the condition that the first electronic device does not have a display screen.

At 103, when the first determination result indicates that the first electronic device satisfies the preset condition, the information to be processed is converted to second type information, i.e., information of a second type. The first type information corresponds to a first presentation mode, the second type information corresponds to a second presentation mode, and the second presentation mode is different from the first presentation mode.

The first electronic device satisfying the preset condition indicates that the first electronic device cannot present or well present the first type information for the user. That is, the first electronic device cannot present or well present the information to be processed. Therefore, the present disclosure performs the conversion on the type of the information to be processed. That is, the information to be processed is converted to the second type information. The second type information is information that can be well presented, when the first electronic device satisfies the preset condition.

The second type information corresponds to the second presentation mode, and the second presentation mode is different from the first presentation mode.

When converting the information to be processed, the content of the second type information derived by the conversion can reflect at least part of the content of the information to be processed. As such, through the second type information presented on the first electronic device, the user can learn at least part of the information to be processed.

At 104, when a presentation instruction for the second type information derived by the conversion is obtained, the second type information is presented on the first electronic device using the second presentation mode.

The presentation instruction may be an instruction that is automatically triggered by the first electronic device based on the preset condition. For example, when the first electronic device receives an instant message, the instant message is presented automatically by default. Thus, the presentation instruction is automatically triggered. The presentation instruction may also be an instruction that is triggered by the user performing a corresponding action on the first electronic device. For example, when the user clicks on a thumbnail image, accordingly, the first electronic device can detect the action and trigger the presentation instruction for the image.

After the information to be processed is converted to the second type information, when the presentation instruction for the second type information derived by the conversion is obtained, the first electronic device can present the second type information using the second presentation mode. As such, the problem that the first electronic device cannot present or well present the original information to be processed (i.e., the first type information) can be overcome.

Because the content of the second type information can reflect at least part of the content of the information to be processed, the user can learn at least part of the information to be processed through the second type information presented on the first electronic device.

Consistent with the disclosure, an information processing method that can be implemented in the first electronic device is provided. The information processing method includes obtaining the information to be processed and determining the type of the information to be processed; when the information to be processed is the first type information, determining whether the first electronic device satisfies the preset condition; when the first electronic device satisfies the preset condition, converting the information to be processed to the second type information, the first type information corresponding to the first presentation mode, the second type information corresponding to the second presentation mode that is different from the first presentation mode; when the presentation instruction for the second type information derived by the conversion is obtained, presenting the second type information using the second presentation mode. Therefore, based on the present disclosure, by converting the information that cannot be presented or well presented in the small-screen device or screenless device (e.g., an image, a video, etc.), to another, more appropriate type of information (e.g., voice information, etc.), a well presentation of the information can be achieved. As such, the user can obtain the information with a better experience.

Figure 2:
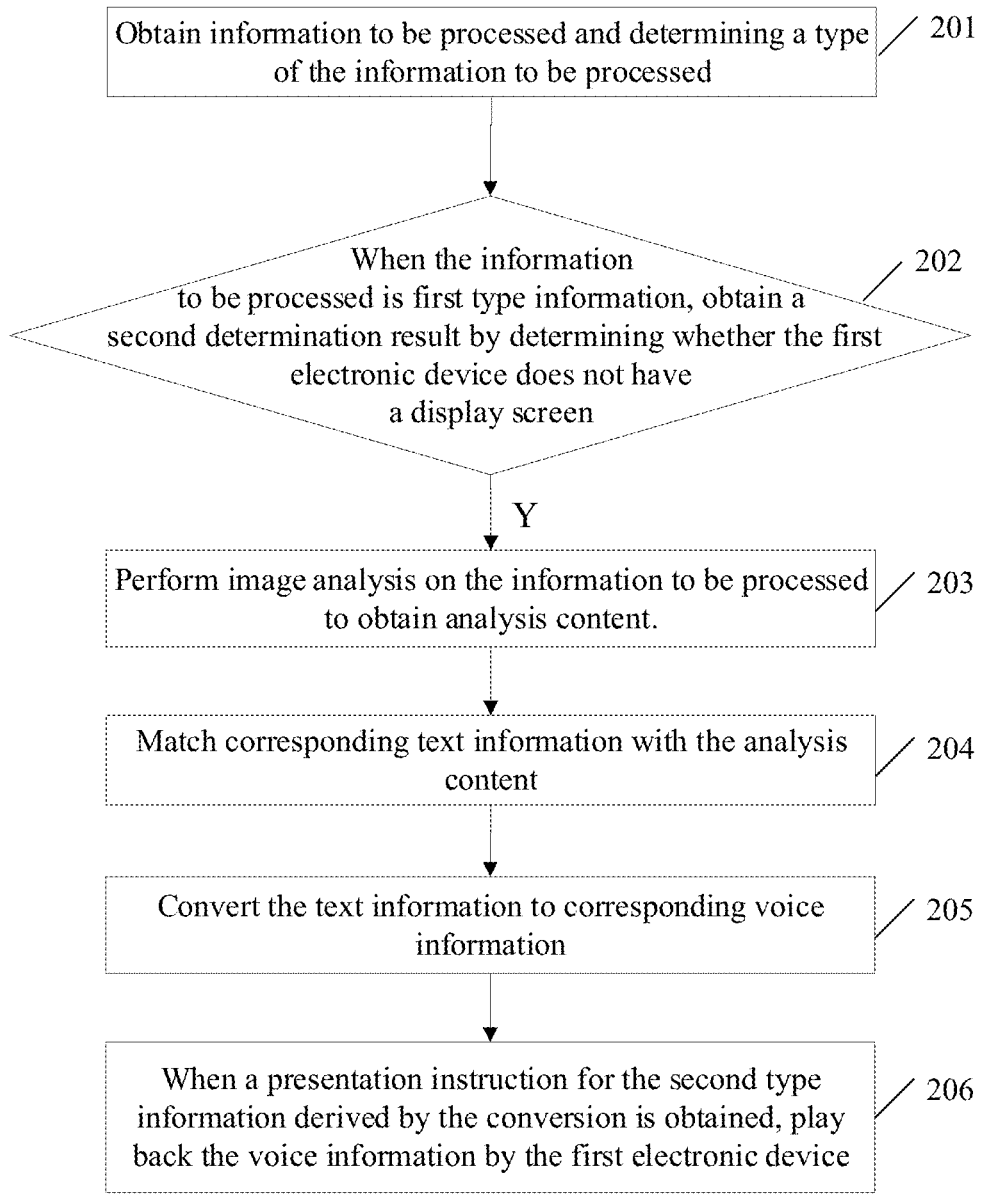
FIG. 2 is a flow chart of an information processing method according to another embodiment of the present disclosure.

FIG. 2 shows a flow chart of another example of information processing method according to the disclosure. As shown in FIG. 2, the information processing method can be implemented by the following processing.

At 201, information to be processed is obtained and a type of the information to be processed is determined.

In some embodiments, the information to be processed may include an instant message obtained by the first electronic device, for example, a text message, a voice message, an image message, a flash video message, or any other form of information obtained based on instant messaging (IM); corresponding resource information downloaded from the Internet by the first electronic device; or various resource information stored in the first electronic device in advance, but is not limited thereto.

The information to be processed may be one of different types according to the presentation mode corresponding to the information to be processed. In some embodiments, based on the mode for presenting the information to be processed, the type of the information can be, for example, a text type corresponding to a text presentation mode, a voice type corresponding to a voice presentation mode, an image/video type corresponding to an image/video presentation mode, or the like.

At 202, when the information to be processed is the first type information, a second determination result is obtained by determining whether the first electronic device does not have a display screen.

In some embodiments, the first type information may be image and/or video information. The preset condition is that the electronic device does not have a display screen. In these embodiments, the first electronic device may be a screenless device, such as a smart phone, a smart stereo, or the like, and thus cannot display image and/or video information.

Therefore, when the information to be processed is determined to be the first type information (i.e., when the information to be processed is determined to be the image or video information), whether the first electronic device has a display screen is determined.

At 203, when the second determination result indicates that the first electronic device does not have a display screen, image analysis is performed on the information to be processed to obtain analysis content.

Determining that the first electronic device does not have a display screen means that the first electronic device cannot display the information to be processed that belongs to the image or video information type. The present disclosure can solve the problem by converting the type of the information to be processed. In some embodiments, image analysis is performed on the information to be processed. The analysis content obtained by the image analysis can provide data support needed for converting the information type of the information to be processed.

When the information to be processed is an image, the corresponding algorithm, such as the deep learning algorithm, etc., can be used to directly analyze the image. When the information to be processed is a video, the video may be first divided into multiple image frames, and then the image analysis can be performed on the multiple image frames. The analysis content obtained by image analysis, for example, title and/or abstract content, etc., that matches the information to be processed, can reflect at least part of the content of the information to be processed.

At 204, corresponding text information is matched with the analysis content.

Based on the analysis content obtained by performing image analysis on the information to be processed, the corresponding text information can be matched with the analysis content. For example, the corresponding title and/or abstract text can be matched with the title and/or abstract content obtained by analyzing.

At 205, the text information is converted to corresponding voice information.

Because the first electronic device does not have a display screen, after obtaining the text information corresponding to the analysis content, the text information is converted to the corresponding voice information (the second type information). As such, the first electronic device having no display screen can present the analysis content in the form of voice playback.

At 206, when a presentation instruction for the second type information derived by the conversion is obtained, the voice information is played back by the first electronic device.

When the presentation instruction for the second type information derived by the conversion is obtained (i.e., when the presentation instruction for the voice information is obtained,) the voice information can be played back by the first electronic device.

Consistent with the disclosure, for the screenless device, such as a smart headphone, a smart stereo, or the like, the image and/or video information can be converted to the voice information for voice playback. Therefore, the problem that the screenless device cannot display the image and/or video information can be overcome. As such, when the screenless device receives the image and/or video information, the user can still effectively obtain the device information.

Figure 3:
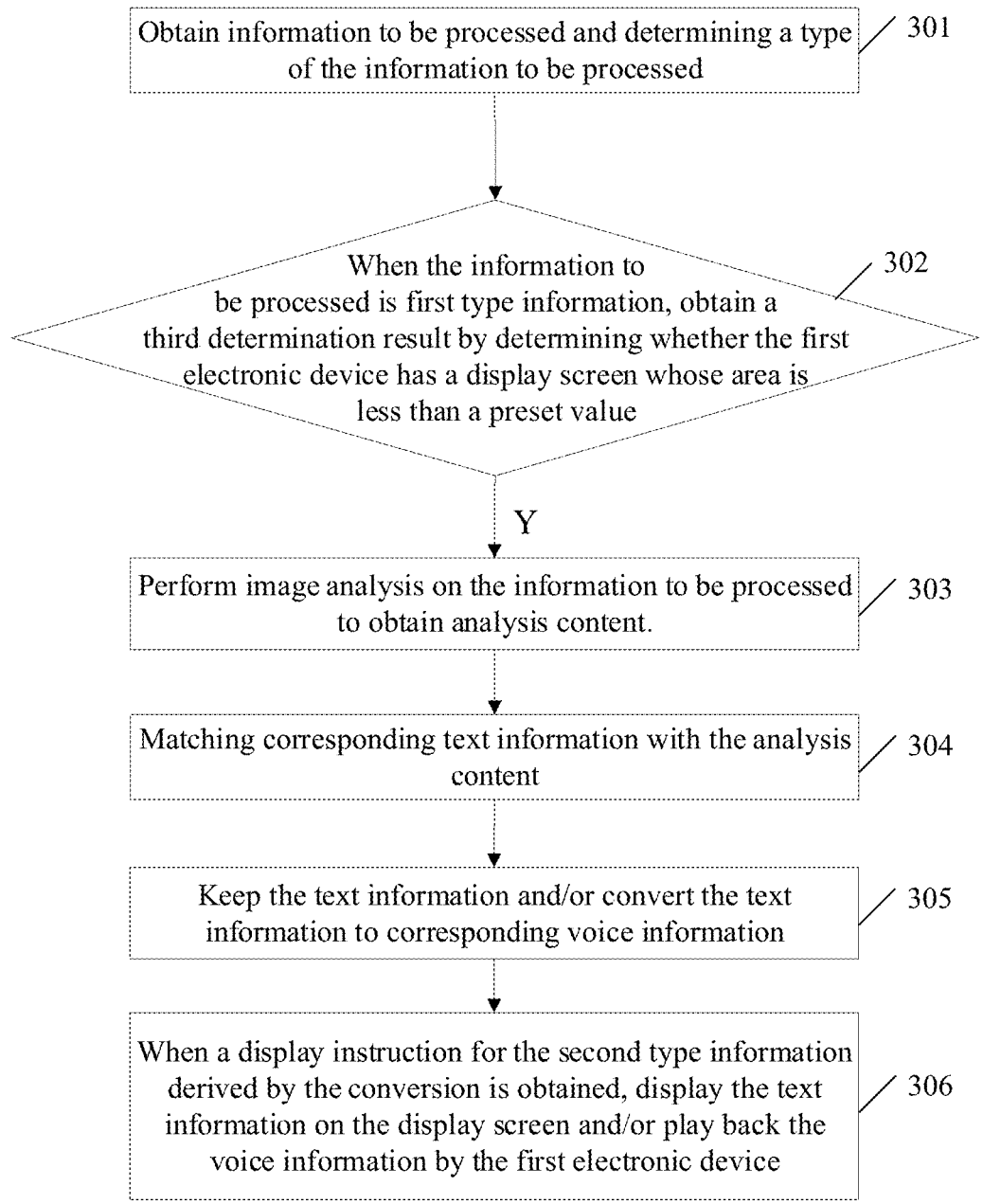
FIG. 3 is a flow chart of an information processing method according to another embodiment of the present disclosure.

FIG. 3 shows a flow chart of another example of information processing method according to the disclosure. As shown in FIG. 3, the information processing method can be implemented by the following processing.

At 301, information to be processed is obtained and a type of the information to be processed is determined.

In some embodiments, the information to be processed may include an instant message obtained by the first electronic device, for example, a text message, a voice message, an image message, a flash video message, or any other form of information obtained based on instant messaging (IM); corresponding resource information downloaded from the Internet by the first electronic device; or various resource information stored in the first electronic device in advance, but is not limited thereto.

The information to be processed may be one of different types according to the presentation mode corresponding to the information to be processed. In some embodiments, based on the mode for presenting the information to be processed, the type of the information can be, for example, a text type corresponding to a text presentation mode, a voice type corresponding to a voice presentation mode, an image/video type corresponding to an image/video presentation mode, or the like.

At 302, when the information to be processed is first type information, a third determination result is obtained by determining whether the first electronic device has a display screen whose area is less than a preset value.

In some embodiments, the first type information may be image and/or video information. The preset condition is that the first electronic device is a small-screen device. For example, the first electronic device has a display screen and the screen area is less than the preset value.

Consistent with the disclosure, a solution can be provided for the problem that a small-screen device, such as a smart watch, a smart bracelet, or the like, cannot well present the image and/or video information due to problems caused by its small screen, such as poor recognizability.

Therefore, when the information to be processed is determined to be the first type information (i.e., when the information to be processed is determined to be the image and/or video information), it is further determined whether the first electronic device has a display screen and a screen area is less than the preset value. As such, whether the first electronic device is a small-screen device can be determined.

At 303, when the third determination result indicates that the first electronic device has a display screen and the screen area is less than the preset value, image analysis is performed on the information to be processed to obtain the analysis content.

When determining that the first electronic device has a display screen and the screen area is less than the preset value, the first electronic device is determined to be a small-screen device. Because the screen is too small, the information to be processed that belongs to the image and/or video information type cannot be well presented. Consistent with the present disclosure, the type of the information to be processed can be converted. In some embodiments, image analysis is performed on the information to be processed. The analysis content obtained by the image analysis can provide data support needed for converting the information type of the information to be processed.

When the information to be processed is an image, the corresponding algorithm, such as the deep learning algorithm, etc., can be used to directly analyze the image. When the information to be processed is a video, the video may be first divided into multiple image frames, and then the image analysis can be performed on the multiple image frames. The analysis content obtained by image analysis, for example, title and/or abstract content, etc., that matches the information to be processed, can reflect at least part of the content of the information to be processed.

At 304, corresponding text information is matched with the analysis content.

Based on the analysis content obtained by performing image analysis on the information to be processed, the corresponding text information can be matched with the analysis content. For example, the corresponding title and/or abstract text can be matched with the title and/or abstract content obtained by analyzing.

At 305, the text information is kept and/or converted to corresponding voice information.

Because the first electronic device has a display screen, after the text information corresponding to the analysis content is obtained, the text information may still be presented on the display screen, although the small screen may not well present the image and/or video information. For example, title or abstract text corresponding to the image may still be clearly displayed. As such, unlike the screenless device that can only present information in the form of voice, the small-screen device may present the information in the form of text, or voice, or a combination of both.

As such, the text information can be kept and/or converted to the corresponding voice information.

At 306, when a presentation instruction for the second type information derived by the conversion is obtained, the first electronic device displays the text information on the display screen and/or plays back the voice information.

When the presentation instruction for the second type information derived by the conversion is obtained (i.e., when the presentation instruction for the text information and/or the voice information is obtained), the first electronic device can display the text information on the display screen and/or play back the voice information.

FIG. 4(*a*) shows a smart watch as an example of a small-screen device. FIG. 4(*b*) schematically illustrates the presentation of the image or video information of the smart watch in the form of text and/or voice.

Consistent with the disclosure, for the small-screen device, such as a smart watch, a smart band, or the like, the image and/or video information can be converted to the corresponding text and/or voice information for text display and/or voice playback. Therefore, the problem that the small-screen device cannot well present the image and/or video information can be overcome. For example, when the small-screen device receives the image and/or video information, the user can still effectively obtain the device information in the form of text or voice. The problem that the small-screen leads to poor recognizability of the image content can be overcome.

The described embodiments merely provide example solutions for the problem that the screenless or small-screen device cannot present or well present the image and/or video information. It will be apparent to persons skilled in the art that the application scenario of the present disclosure is not limited thereto. For example, the present disclosure can also be implemented in a smart phone, a tablet PC, or another terminal device. In the situation when the terminal device's user status satisfies a certain condition, for example, when the user is back to or away from the phone screen, the image and/or video information in the terminal device can be converted to a more appropriate type of information (e.g., the voice information) for presentation, which can facilitate the user to obtain the information.

Figure 5:
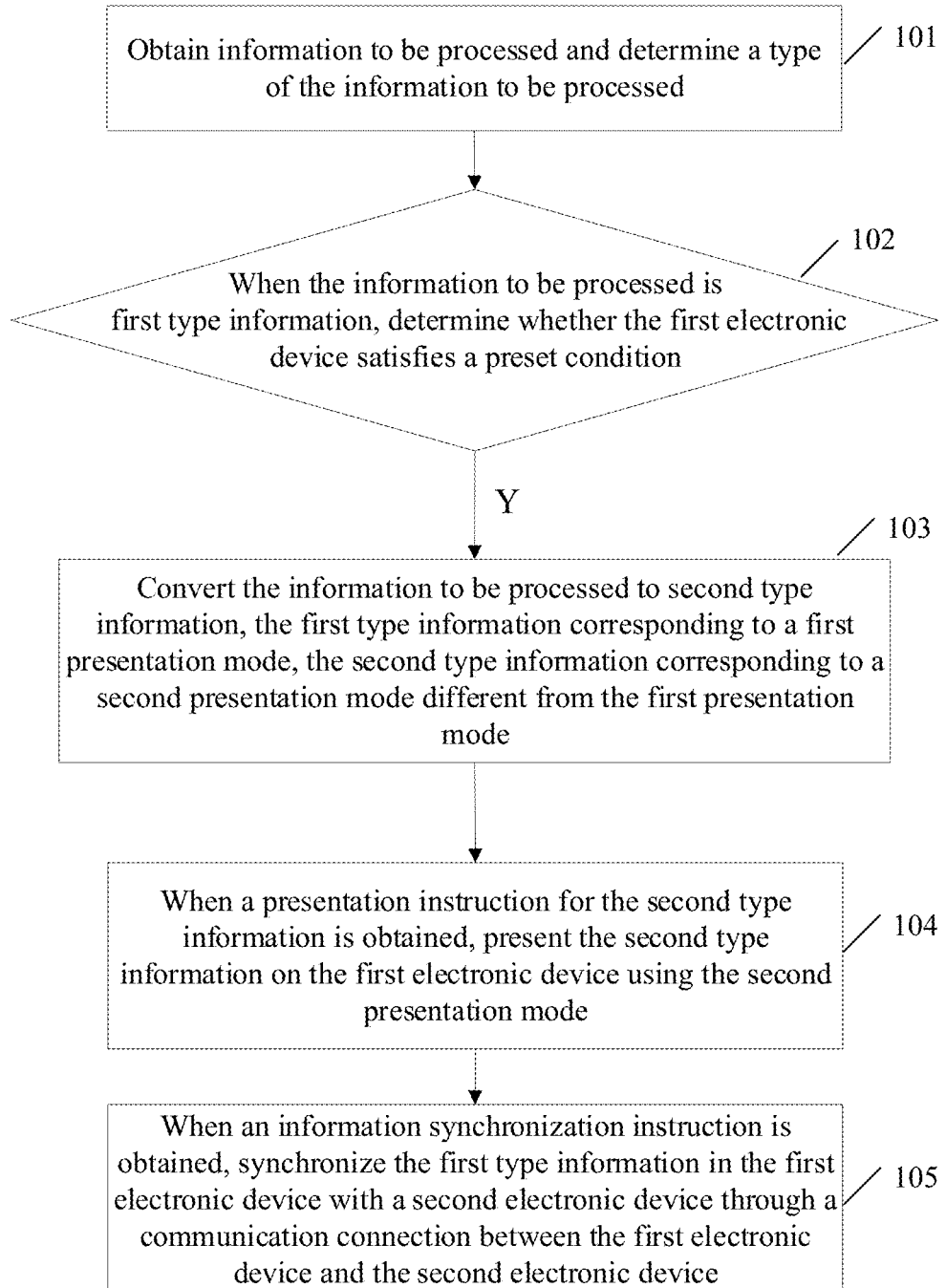
FIG. 5 is a flow chart of an information processing method according to another embodiment of the present disclosure.

FIG. 5 shows a flow chart of another example of information processing method according to the disclosure. The information processing method shown in FIG. 5 is similar to the information processing method shown in FIG. 1, except that the information processing method shown in FIG. 5 includes additional processing as described below.

At 105, when an information synchronization instruction is obtained, the first type information in the first electronic device is synchronized with a second electronic device. A communication connection is established between the first electronic device and the second electronic device.

In the present embodiment, the first electronic device may be the screenless or small-screen device as described above. The second electronic device may be the smart phone, tablet PC, or another terminal device.

The information synchronization instruction may be an instruction that is automatically triggered by the first electronic device when a certain condition is met. For example, the smart band automatically triggers a synchronization instruction for the received information (e.g., short messages, images, videos, or the like) at a regular period (such as, one day, one week, etc.). Thus, the short messages, images, videos, or other information can be synchronized to the second electronic device, such as the smart phone, tablet PC, or other terminal device. The information synchronization instruction may also be an instruction that is triggered by the user through performing a corresponding operation on the first electronic device. For example, the user can trigger the synchronization instruction by operating a virtual or physical button on the first electronic device.

A communication connection may be established between the first electronic device and the second electronic device. The communication connection may be established in advance before the synchronization instruction is issued, or the communication connection may be established in real time by the first electronic device in response to the synchronization instruction when the synchronization instruction is issued. The communication connection may be any kind of wireless connection, such as Bluetooth, Wi-Fi (Wireless-Fidelity), or may be a wired connection.

According to the disclosure, the device's function can be expanded and the application for the user can be enriched by synchronizing the first type information of the first electronic device to the second electronic device when the information synchronization instruction is obtained. For example, when the first electronic device is a screenless or small-screen device, information (e.g., the image and/or video information) that cannot be presented or well presented is synchronized to a terminal (e.g., a mobile phone, a tablet, or the like) for presentation. The user experience is further enhanced.

Figure 6:
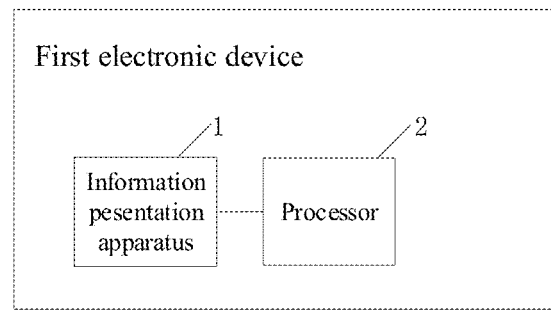
FIG. 6 is a structure diagram of an electronic device according to an embodiment of the present disclosure.

The present disclosure provides a first electronic device. The first electronic device may be, but is not limited to, a small-screen or screenless smart device, such as smart glasses, a smart watch, a smart headphone, or a smart stereo, or a smart device with a normal display area, such as a smartphone or a tablet PC. FIG. 6 shows a structure diagram of an example of the first electronic device according to the disclosure. As shown in FIG. 6, the first electronic device comprises an information presentation apparatus 1 and a processor 2.

The information presentation apparatus 1 may be an apparatus configured to present information, such as text, voice, or image/video, or the like, and can include, for example, an output device.

The processor 2 is configured to obtain information to be processed and determine a type of the information to be processed.

When the information to be processed is first type information, the processor 2 obtains a first determination result by determining whether the first electronic device satisfies a preset condition.

When the first determination result indicates that the first electronic device satisfies the preset condition, the processor 2 converts the information to be processed to second type information. The first type information corresponds to a first presentation mode, the second type information corresponds to a second presentation mode, and the second presentation mode is different from the first presentation mode.

When a presentation instruction for the second type information derived by the conversion is obtained, the processor 2 controls the information presentation apparatus 1 to present the second type information on the first electronic device using the second presentation mode.

In some embodiments, the information to be processed may include an instant message obtained by the first electronic device, for example, a text message, a voice message, an image message, a flash video message, or any other form of information obtained based on instant messaging (IM); corresponding resource information downloaded from the Internet by the first electronic device; or various resource information stored in the first electronic device in advance, but is not limited thereto.

The information to be processed may be one of different types according to the presentation mode corresponding to the information to be processed. In some embodiments, based on the mode for presenting the information to be processed, the type of the information can be, for example, a text type corresponding to a text presentation mode, a voice type corresponding to a voice presentation mode, an image/video type corresponding to an image/video presentation mode, or the like.

The preset condition may be a condition indicating the structure of the first electronic device, for example, a condition indicating whether the first electronic device has a display screen, a condition indicating the characteristic of the display screen, or a condition indicating a status of a user of the first electronic device.

The first type information may be information that cannot be presented or well presented for the user, when the first electronic device satisfies the preset condition.

For example, assume the preset condition is that the electronic device does not have a display screen, thus, the first type information may be information, such as images, videos, or the like, that cannot be presented under the condition that the first electronic device does not have a display screen.

The first electronic device satisfying the preset condition indicates that the first electronic device cannot present or well present the first type information for the user. That is, the first electronic device cannot present or well present the information to be processed. Therefore, according to the present disclosure, the processor 2 performs the conversion on the type of the information to be processed. That is, the information to be processed is converted to the second type information. The second type information is information that can be well presented, when the first electronic device satisfies the preset condition.

The second type information corresponds to the second presentation mode, and the second presentation mode is different from the first presentation mode.

When converting the information to be processed, the content of the second type information derived by the conversion can reflect at least part of the content of the information to be processed. As such, through the second type information presented on the first electronic device, the user can learn at least part of the information to be processed.

The presentation instruction may be an instruction that is automatically triggered by the first electronic device based on the preset condition. For example, when the first electronic device receives an instant message, the instant message is presented automatically by default. Thus, the presentation instruction is automatically triggered. The presentation instruction may also be an instruction that is triggered by the user performing a corresponding action on the first electronic device. For example, when the user clicks on a thumbnail image, accordingly, the first electronic device can detect the action and trigger the presentation instruction for the image.

After the information to be processed is converted to the second type information, when the presentation instruction for the second type information derived by the conversion is obtained, the processor 2 can control the information presentation apparatus 1 to present the second type information using the second presentation mode. As such, the problem that the first electronic device cannot present or well present the original information to be processed (i.e., the first type information) can be overcome. Because the content of the second type information can reflect at least part of the content of the information to be processed, the user can learn at least part of the information to be processed through the second type information presented on the first electronic device.

Consistent with the disclosure, a first electronic device is provided. The first electronic device can obtain the information to be processed and determining the type of the information to be processed; when the information to be processed is the first type information, determine whether the first electronic device satisfies the preset condition; when the first electronic device satisfies the preset condition, convert the information to be processed to the second type information, the first type information corresponding to the first presentation mode, the second type information corresponding to the second presentation mode that is different from the first presentation mode; when the presentation instruction for the second type information derived by the conversion is obtained, present the second type information using the second presentation mode. Therefore, based on the present disclosure, by converting the information that cannot be presented or well presented in the small-screen device or screenless device (e.g., an image, a video, etc.), to another, more appropriate type of information (e.g., voice information, etc.), a well presentation of the information can be achieved. As such, the user can obtain the information with a better experience.

In some other embodiments, the processor 2 is configured to obtain information to be processed and determine a type of the information to be processed. When the information to be processed is first type information, the processor 2 obtains a second determination result by determining whether the first electronic device does not have a display screen. When the second determination result indicates that the first electronic device does not have a display screen, the processor 2 performs image analysis on the information to be processed to obtain analysis content, match corresponding text information with the analysis content, and convert the text information to corresponding voice information. When a presentation instruction for the second type information derived by the conversion is obtained, the processor controls the voice information to be played back in the first electronic device.

In some embodiments, the information to be processed may include an instant message obtained by the first electronic device, for example, a text message, a voice message, an image message, a flash video message, or any other form of information obtained based on instant messaging (IM); corresponding resource information downloaded from the Internet by the first electronic device; or various resource information stored in the first electronic device in advance, but is not limited thereto.

The information to be processed may be one of different types according to the presentation mode corresponding to the information to be processed. In some embodiments, based on the mode for presenting the information to be processed, the type of the information can be, for example, a text type corresponding to a text presentation mode, a voice type corresponding to a voice presentation mode, an image/video type corresponding to an image/video presentation mode, or the like.

In some embodiments, the first type information may be image and/or video information. The preset condition is that the electronic device does not have a display screen. In these embodiments, the first electronic device may be a screenless device, such as a smart phone, a smart stereo, or the like, and thus cannot display image and/or video information.

Therefore, when the information to be processed is determined to be the first type information (i.e., when the information to be processed is determined to be the image or video information), the processor 2 may need to further determine whether the first electronic device has a display screen.

Determining that the first electronic device does not have a display screen means that the first electronic device cannot display the information to be processed that belongs to the image or video information type. The present disclosure can solve the problem by converting the type of the information to be processed. In some embodiments, image analysis is performed on the information to be processed. The analysis content obtained by the image analysis can provide data support needed for converting the information type of the information to be processed.

When the information to be processed is an image, the corresponding algorithm, such as the deep learning algorithm, etc., can be used to directly analyze the image. When the information to be processed is a video, the video may be first divided into multiple image frames, and then the image analysis can be performed on the multiple image frames. The analysis content obtained by image analysis, for example, title and/or abstract content, etc., that matches the information to be processed, can reflect at least part of the content of the information to be processed.

Based on the analysis content obtained by performing image analysis on the information to be processed, the corresponding text information can be matched with the analysis content. For example, the corresponding title and/or abstract text can be matched with the title and/or abstract content obtained by analyzing.

Because the first electronic device does not have a display screen, after obtaining the text information corresponding to the analysis content, the text information is converted to the corresponding voice information (the second type information). As such, the first electronic device having no display screen can present the analysis content in the form of voice playback.

When the presentation instruction for the second type information derived by the conversion is obtained (i.e., when the presentation instruction for the voice information is obtained,) the voice information can be played back by the first electronic device.

Consistent with the disclosure, for the screenless device, such as a smart headphone, a smart stereo, or the like, the image and/or video information can be converted to the voice information for voice playback. Therefore, the problem that the screenless device cannot display the image and/or video information can be overcome. As such, when the screenless device receives the image and/or video information, the user can still effectively obtain the device information.

In some other embodiments, the processor 2 is configured to obtain information to be processed and determine a type of the information to be processed. When the information to be processed is first type information, the processor 2 obtains a third determination result by determining whether the first electronic device has a display screen whose area is less than a preset value. When the third determination result indicates that the first electronic device has a display screen and the screen area is less than the preset value, the processor 2 performs image analysis on the information to be processed to obtain analysis content, match corresponding text information with the analysis content, and keep the text information and/or convert the text information to corresponding voice information. When a presentation instruction for the second type information derived by the conversion is obtained, the processor 2 controls the first electronic device to display the text information on the display screen and/or play back the voice information.

In some embodiments, the information to be processed may include an instant message obtained by the first electronic device, for example, a text message, a voice message, an image message, a flash video message, or any other form of information obtained based on instant messaging (IM); corresponding resource information downloaded from the Internet by the first electronic device; or various resource information stored in the first electronic device in advance, but is not limited thereto.

The information to be processed may be one of different types according to the presentation mode corresponding to the information to be processed. In some embodiments, based on the mode for presenting the information to be processed, the type of the information can be, for example, a text type corresponding to a text presentation mode, a voice type corresponding to a voice presentation mode, an image/video type corresponding to an image/video presentation mode, or the like.

In some embodiments, the first type information may be image and/or video information. The preset condition is that the first electronic device is a small-screen device. For example, the first electronic device has a display screen and the screen area is less than the preset value.

Consistent with the disclosure, a solution can be provided for the problem that a small-screen device, such as a smart watch, a smart bracelet, or the like, cannot well present the image and/or video information due to problems caused by its small screen, such as poor recognizability.

Therefore, when the information to be processed is determined to be the first type information (i.e., when the information to be processed is determined to be the image and/or video information), the processor 2 may need to further determine whether the first electronic device has a display screen and a screen area is less than the preset value. As such, whether the first electronic device is a small-screen device can be determined.

When determining that the first electronic device has a display screen and the screen area is less than the preset value, the first electronic device is determined to be a small-screen device. Because the screen is too small, the information to be processed that belongs to the image and/or video information type cannot be well presented. Consistent with the present disclosure, the type of the information to be processed can be converted. In some embodiments, image analysis is performed on the information to be processed. The analysis content obtained by the image analysis can provide data support needed for converting the information type of the information to be processed When the information to be processed is an image, the corresponding algorithm, such as the deep learning algorithm, etc., can be used to directly analyze the image. When the information to be processed is a video, the video may be first divided into multiple image frames, and then the image analysis can be performed on the multiple image frames. The analysis content obtained by image analysis, for example, title and/or abstract content, etc., that matches the information to be processed, can reflect at least part of the content of the information to be processed.

Based on the analysis content obtained by performing image analysis on the information to be processed, the corresponding text information can be matched with the analysis content. For example, the corresponding title and/or abstract text can be matched with the title and/or abstract content obtained by analyzing.

Because the first electronic device has a display screen, after the text information corresponding to the analysis content is obtained, the text information may still be presented on the display screen, although the small screen may not well present the image and/or video information. For example, title or abstract text corresponding to the image may still be clearly displayed. As such, unlike the screenless device that can only present information in the form of voice, the small-screen device may present the information in the form of text, or voice, or a combination of both.

As such, the processor 2 can keep the text information and/or convert the text information to the corresponding voice information.

When the presentation instruction for the second type information derived by the conversion is obtained (i.e., when the presentation instruction for the text information and/or the voice information is obtained), the processor 2 can control the first electronic device to display the text information on the display screen and/or play back the voice information.

Figure 4A:
FIG. 4($a$) is a schematic diagram of a smart watch.
Figure 4B:
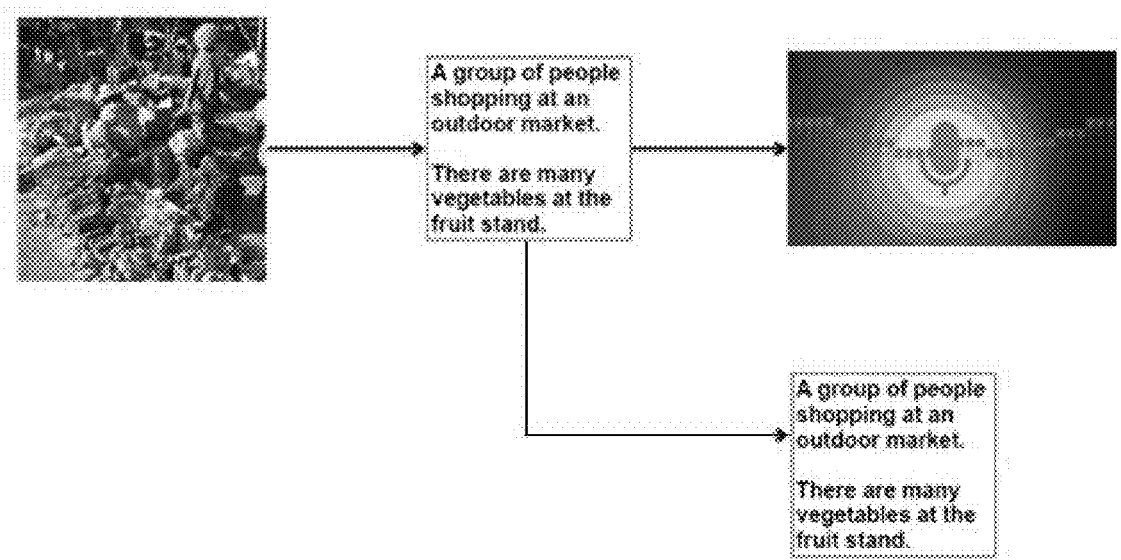

FIG. 4(a) shows a smart watch as an example of a small-screen device. As shown in FIG. 4(b), the image or video information of the smart watch can be presented in the form of text and/or voice.

Consistent with the disclosure, for the small-screen device, such as a smart watch, a smart band, or the like, the image and/or video information can be converted to the corresponding text and/or voice information for text display and/or voice playback. Therefore, the problem that the small-screen device cannot well present the image and/or video information can be overcome. For example, when the small-screen device receives the image and/or video information, the user can still effectively obtain the device information in the form of text or voice. The problem that the small-screen leads to poor recognizability of the image content can be overcome.

The described embodiments merely provide example solutions for the problem that the screenless or small-screen device cannot present or well present the image and/or video information. It will be apparent to persons skilled in the art that the application scenario of the present disclosure is not limited thereto. For example, the present disclosure can also be implemented in a smart phone, a tablet PC, or another terminal device. In the situation when the terminal device's user status satisfies a certain condition, for example, when the user is back to or away from the phone screen, the image and/or video information in the terminal device can be converted to a more appropriate type of information (e.g., the voice information) for presentation, which can facilitate the user to obtain the information.

In some embodiments, the processor 2 is further configured to, when an information synchronization instruction is obtained, synchronize the first type information in the first electronic device with a second electronic device. A communication connection is established between the first electronic device and the second electronic device.

In the present embodiment, the first electronic device may be the screenless or small-screen device as described above. The second electronic device may be the smart phone, tablet PC, or another terminal device.

The information synchronization instruction may be an instruction that is automatically triggered by the first electronic device when a certain condition is met. For example, the smart band automatically triggers a synchronization instruction for the received information (e.g., short messages, images, videos, or the like) at a regular period (such as, one day, one week, etc.). Thus, the short messages, images, videos, or other information can be synchronized to the second electronic device, such as the smart phone, tablet PC, or other terminal device. The information synchronization instruction may also be an instruction that is triggered by the user through performing a corresponding operation on the first electronic device. For example, the user can trigger the synchronization instruction by operating a virtual or physical button on the first electronic device.

A communication connection may be established between the first electronic device and the second electronic device. The communication connection may be established in advance before the synchronization instruction is issued, or the communication connection may be established in real time by the first electronic device in response to the synchronization instruction when the synchronization instruction is issued. The communication connection may be any kind of wireless connection, such as Bluetooth, Wi-Fi (Wireless-Fidelity), or may be a wired connection.

According to the disclosure, the device's function can be expanded and the application for the user can be enriched by synchronizing the first type information of the first electronic device to the second electronic device when the information synchronization instruction is obtained. For example, when the first electronic device is a screenless or small-screen device, information (e.g., the image and/or video information) that cannot be presented or well presented is synchronized to a terminal (e.g., a mobile phone, a tablet, or the like) for presentation. The user experience is further enhanced.

In the present disclosure, the embodiments are described in a gradual and progressive manner with the emphasis of each embodiment on an aspect different from other embodiments. The same or similar parts between the various embodiments may be referred to each other.

For the simplicity of description, the above-described systems or devices are divided into various modules or units according to the functions. When implementing the present disclosure, the functions of various units may be implemented in a same or multiple software and/or hardware.

It is apparent to a person skilled in the art that the present disclosure can be implemented by means of software plus a hardware platform. The present disclosure can also be implemented in the form of a software product stored in a storage medium (such as ROM/RAM, magnetic disc, optical disc, etc.), which may include a number of instructions for enabling a terminal device (which may be a personal computer, a server, a network device, or the like) to perform a method consistent with the disclosure, such as one of the methods described above.

The terms "first," "second," or the like in the specification, claims, and the drawings of the present disclosure are merely used to distinguish an entity or an operation from another entity or operation, and are not intended to require or indicate that there is any such physical relationship or sequence between these entities or operations. In addition, the terms "including," "comprising," and variants thereof herein are open, non-limiting terminologies, which are meant to encompass a series of elements of processes, methods, items, or devices. Not only those elements, but also other elements that are not explicitly listed, or elements that are inherent to such processes, methods, items, or devices. In the absence of more restrictions, the elements defined by the statement "include a/an . . . " not preclude that other identical elements are included in the processes, methods, items, or devices that include the elements.

The embodiments disclosed herein are merely examples. Other applications, advantages, alternations, modifications, or equivalents to the disclosed embodiments are obvious to a person skilled in the art and are intended to be encompassed within the scope of the present disclosure.

What is claimed is:

1. An information processing method comprising:
    determining information received by an electronic device is information of a first type, the first type information including at least information selected from the group including image information and video information;
    converting the first type information to information of a second type, including:
        performing image analysis on the first type information to obtain analysis content; and
        providing corresponding text information with the analysis content; and
    in response to receiving a presentation instruction for the second type information, presenting the second type information on the electronic device using a presentation mode corresponding to the second type information.

2. The method according to claim 1, further comprising:
    determining whether or not the electronic device includes a display screen, and
    responsive to determining that the electronic device does not include a display screen, converting the first type information to the second type information which includes:
        converting the text information to corresponding voice information.

3. The method according to claim 2, wherein presenting the second type information on the electronic device includes:
    playing back the voice information in the electronic device.

4. The method according to claim 1, further comprising:
    determining whether or not the electronic device includes a display screen with a screen area smaller than a preset value, and
    responsive to determining that the electronic device includes the display screen with the screen area smaller than the preset value, converting the first type information to the second type information which includes performing at least one selected from the group of actions including:
        keeping the text information, and
        converting the text information to corresponding voice information.

5. The method according to claim 4, wherein presenting the second type information on the electronic device includes performing at least one selected from the group of actions including:
    displaying the text information on the display screen of the electronic device, and
    playing back the voice information in the electronic device.

6. The method according to claim 1, further comprising:
    in response to obtaining an information synchronization instruction, synchronizing the first type information in the electronic device with another electronic device through a communication connection established between the electronic device and the other electronic device.

7. An electronic device comprising:
    a processor; and
    an output device coupled to the processor, wherein the processor is configured to:
        determine information received by the electronic device is information of a first type, the first type information including at least information selected from the group including image information and video information;
        perform image analysis on the first type information to obtain analysis content;
        provide corresponding text information to the analysis content convert the first type information to information of a second type; and
        in response to receiving a presentation instruction for the second type information, control the output device to present the second type information using a presentation mode corresponding to the second type information.

8. The electronic device according to claim 7, wherein the processor is further configured to:
    convert the text information to corresponding voice information, in response to determining that the electronic device does not have a display screen.

9. The electronic device according to claim 8, wherein the processor is further configured to:
    control the output device to play back the voice information.

10. The electronic device according to claim 7, wherein the processor is further configured to:
    in response to determining that the electronic device has a display screen with a screen area smaller than a preset value, perform at least one selected from the group of actions including:
        keeping the text information, and
        converting the text information to corresponding voice information.

11. The electronic device according to claim 10, wherein the processor is further configured to perform at least one selected from the group of actions including:
    to control the display screen to display the text information, and
    to control the output device to play back the voice information.

12. The electronic device according to claim 7, wherein the processor is further configured:
    in response to obtaining an information synchronization instruction, to synchronize the first type information in the electronic device with another electronic device through a communication connection established between the electronic device and the other electronic device.

\* \* \* \* \*